United States Patent
Garcia Estebanez et al.

(10) Patent No.: US 8,165,755 B2
(45) Date of Patent: Apr. 24, 2012

(54) DEVICE AND METHOD FOR MONITORING THE TURN COMMAND TO A STEERED REAR WHEEL

(75) Inventors: Pablo Garcia Estebanez, Paris (FR); Stephane Guegan, Versailles (FR)

(73) Assignee: Renault S.A.S., Boulogne-Billancourt (FR)

( * ) Notice: Subject to any disclaimer, the term of this patent is extended or adjusted under 35 U.S.C. 154(b) by 547 days.

(21) Appl. No.: 12/374,122

(22) PCT Filed: May 16, 2007

(86) PCT No.: PCT/FR2007/051281
§ 371 (c)(1),
(2), (4) Date: Mar. 20, 2009

(87) PCT Pub. No.: WO2008/009832
PCT Pub. Date: Jan. 24, 2008

(65) Prior Publication Data
US 2009/0326762 A1     Dec. 31, 2009

(30) Foreign Application Priority Data
Jul. 21, 2006   (FR) ..................... 06 06666

(51) Int. Cl.
*B62D 7/15* (2006.01)
*G06F 19/00* (2006.01)

(52) U.S. Cl. ........................................ 701/42

(58) Field of Classification Search ............... 701/42, 701/41, 69, 89, 88, 94; 280/5.504, 5.51; 180/408, 412, 413, 415
See application file for complete search history.

(56) References Cited

U.S. PATENT DOCUMENTS

| | | | | |
|---|---|---|---|---|
| 5,642,281 A * | 6/1997 | Ishida et al. | | 701/41 |
| 5,799,259 A * | 8/1998 | Rief et al. | | 701/41 |
| 5,944,137 A * | 8/1999 | Moser et al. | | 180/446 |
| 6,226,581 B1 * | 5/2001 | Reimann et al. | | 701/48 |
| 7,330,785 B2 * | 2/2008 | Odenthal et al. | | 701/70 |
| 7,584,042 B2 * | 9/2009 | Suzumura et al. | | 701/70 |
| 2004/0007412 A1 * | 1/2004 | Neef et al. | | 180/402 |
| 2006/0025896 A1 * | 2/2006 | Traechtler et al. | | 701/1 |

FOREIGN PATENT DOCUMENTS
EP   0 601 588   6/1994
FR   2 864 001   6/2005
* cited by examiner

*Primary Examiner* — Tan Q Nguyen
(74) *Attorney, Agent, or Firm* — Oblon, Spivak, McClelland, Maier & Neustadt, L.L.P.

(57) ABSTRACT

A device and method for monitoring a turn command to a steered rear wheel of a vehicle with at least three steered wheels, in which a steering angle datum value for the steered rear wheel is compared against a template, the comparison being made by a computer that generates the datum value.

13 Claims, 4 Drawing Sheets

DEVICE AND METHOD FOR MONITORING THE TURN COMMAND TO A STEERED REAR WHEEL

BACKGROUND OF THE INVENTION

The present invention pertains to the field of control systems for land vehicles, in particular for wheeled motor vehicles.

In a conventional manner, motor vehicles are provided with a chassis, a cabin, wheels connected to the chassis by a suspension mechanism with steered front wheels controlled by a steering wheel at the disposal of the driver in the cabin of the vehicle.

The document FR-A-2 681 303 describes a rear steering control device for motor vehicle with four steered wheels, comprising a cam-forming plate and two idlers disposed in one and the same vertical mid-plane containing the longitudinal axis of a rear steering bar controlling the swiveling of the rear wheels.

This document also describes that, in order to obtain the best possible road behavior of the vehicle, it is necessary to deflect the rear wheels in the same direction as the front wheels for a value of steering wheel deflection angle below a predetermined threshold value and in the opposite direction to the front wheels when the value of the deflection angle exceeds the threshold value. A desirable vehicle "oversteer" effect would thus be obtained when the angle of deflection is relatively large, for example when the vehicle is being parked in a garage or a parking lot, and a likewise desirable "understeer" effect would be obtained when the angle of deflection is relatively small as is the case when the vehicle is running relatively fast.

Nevertheless, such a device, which is relatively crude, does not make it possible to act finely on the behavior of the vehicle.

Patent application FR-A-2 864 001 (Renault) is aimed at a method and a system for controlling steered rear wheel deflection intended for a vehicle. As a function of the front wheel deflection angle, of vehicle movement data, and of an anterior rear wheel deflection setpoint, a current rear wheel deflection setpoint is formulated. This method is satisfactory and makes it possible to reduce the risks of loss of control, which may be due to a vehicle response which is unsuitable as a result of being too lively, insufficiently damped or else quite unpredictable.

The Applicant has realized that it was desirable to further increase operating safety and to monitor the rear wheel deflection setpoint, aberrant values of which may be due to defective components, for example a corrupted memory area or flawed setup of an algorithm. Complete redundancy of the hardware and software components would have offered a solution which turns out to be much too expensive and cumbersome.

BRIEF SUMMARY OF THE INVENTION

The present invention is aimed at remedying the drawbacks of the devices mentioned above.

The aim of the present invention is to provide, in an economic manner, increased safety with a fast reaction to a system for controlling steered rear wheel deflection intended for a vehicle.

The method for monitoring the control of steered rear wheel deflection for a vehicle with at least three steered wheels, comprises the comparison of a steered rear wheel deflection setpoint with a template, said comparison being performed by a computer generating the setpoint.

The same computer serves to generate the setpoint and monitor the occurrence of aberrant values, this turning out to be very economical and rather compact and therefore easy to set up in a computer configured for deflection setpoint generation.

In an embodiment, a static steered rear wheel deflection setpoint is compared with a template. The template can occupy a small-size memory location.

In an embodiment, the template comprises a lower bound and an upper bound. The upper bound can have a zero value up to a first threshold, is linearly increasing between the first threshold and a second threshold, and has a constant value beyond the second threshold. The first threshold can have a zero value. The first threshold can have a value greater than zero.

In an embodiment, the lower bound has a zero value.

In an embodiment, the lower bound has a zero value up to a third threshold, is linearly increasing between the third threshold and a fourth threshold, and has a constant value beyond the fourth threshold. The slope of the upper bound between the first threshold and the second threshold and the slope of the lower bound between the third threshold and the fourth threshold can be identical.

In an embodiment, the third threshold lies between the first threshold and the second threshold. The fourth threshold can be greater than the second threshold.

In an embodiment, the template is a function of the angle of deflection of the front wheels or of the angle of the steering wheel.

In an embodiment, an alarm is generated in the event that the setpoint oversteps the template.

In an embodiment, the setpoint is limited to the template.

The system for monitoring the control of steered rear wheel deflection for a vehicle with at least three steered wheels, comprises a means for comparing a steered rear wheel deflection setpoint with a template, said comparison being performed by the computer generating the setpoint.

In an embodiment, the template is stored in a nonvolatile memory.

By virtue of the invention, the safety of the vehicle is increased by reducing the risk of a dangerous or aberrant setpoint caused by a malfunction of the means for generating the setpoint.

BRIEF DESCRIPTION OF THE DRAWINGS

The present invention will be better understood on studying the detailed description of a few embodiments taken by way of wholly nonlimiting examples and illustrated by the appended drawings, in which.

DETAILED DESCRIPTION OF THE INVENTION

Figure 1:
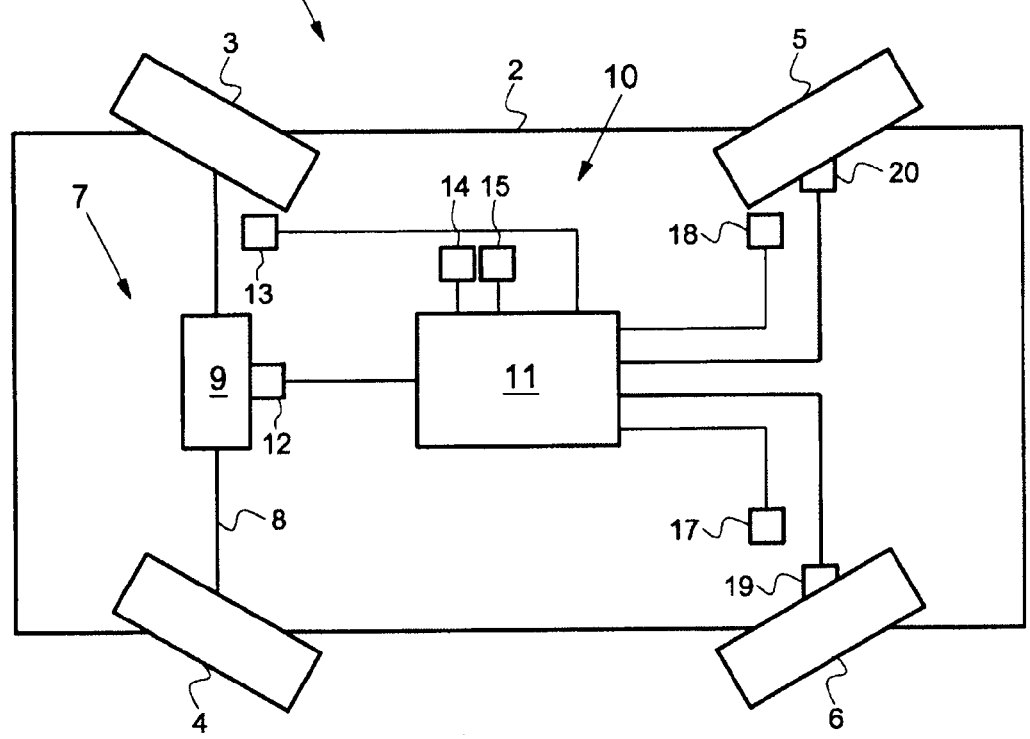
FIG. 1 is a schematic view of a vehicle equipped with a control system.
Figure 2:
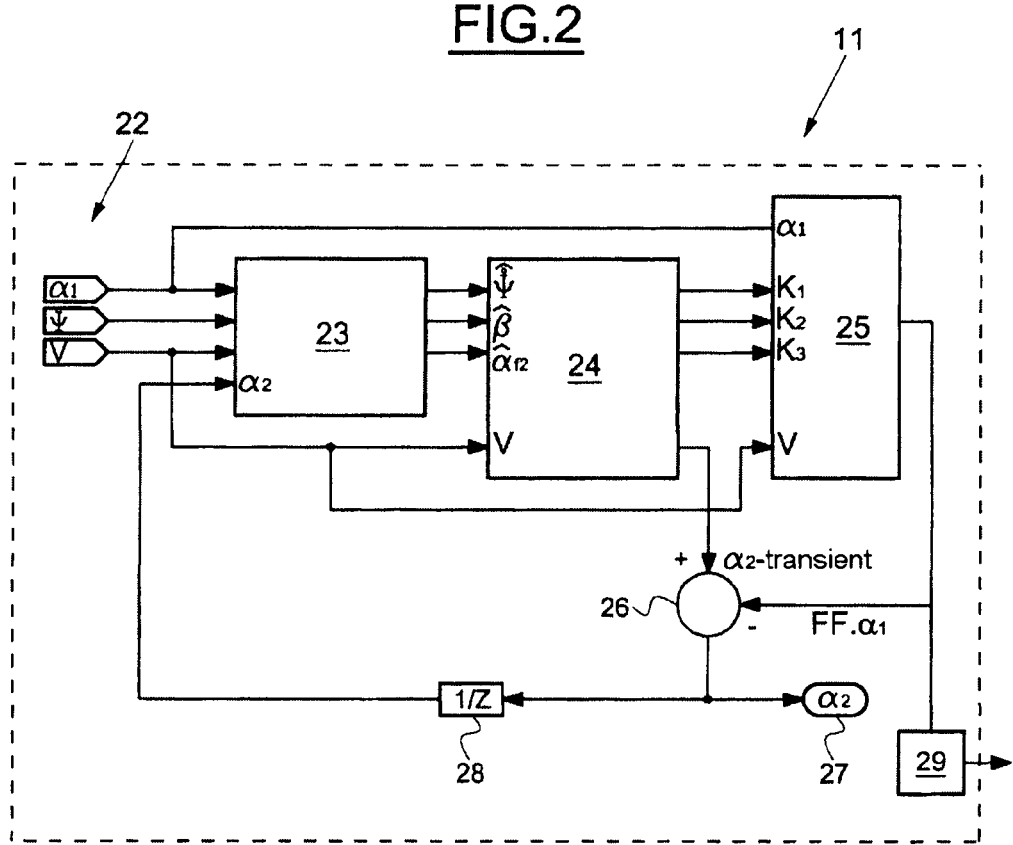
FIG. 2 is a logic diagram of the control system provided with a monitoring system.

As may be seen in FIG. 1, the vehicle 1 comprises a chassis 2, two steered front wheels 3 and 4 and two steered rear wheels 5 and 6, the wheels being connected to the chassis 2 by a suspension mechanism (not represented).

The vehicle 1 is completed with a steering system 7 comprising a rack 8 disposed between the front wheels 3 and 4, a rack actuator 9 able to orient the front wheels 3 and 4 by way of the rack 8 as a function of commands received, in a mechanical or electrical manner, originating from a steering wheel (not represented), at the disposal of a driver of the vehicle.

The control system for aiding deflection 10 is given here by way of example of a system that may be subject to monitoring with a view to increasing operational reliability. The control system for aiding deflection 10 comprises a control unit 11, a sensor 12, for example positioned on the actuator 9, of the deflection position of the front wheels 3 and 4, a sensor 13 of the rate of rotation of the front wheels making it possible to determine the speed V of the vehicle, a sensor 14 of the yaw rate $\dot{\psi}$ of the vehicle, that is to say of the rate of rotation of the vehicle about its center of gravity along a vertical axis, and a sensor 15 of the lateral acceleration at the center of gravity of the vehicle.

Furthermore, the system 10 comprises sensors 17 and 18 of the angle of deflection of the rear wheels 5 and 6, and actuators 19 and 20 making it possible to orient said rear wheels 5 and 6. Nevertheless, a single sensor 17 and a single actuator 19 can suffice for detecting the angle of deflection and orienting the rear wheels 5 and 6. The position and speed sensors can be of optical or else magnetic type, for example Hall-effect type, cooperating with a coder secured to a movable part while the sensor is nonrotating.

The control unit 11 can be embodied in the form of a microprocessor equipped with a random access memory, a read only memory, a central unit and input/output interfaces making it possible to receive information from the sensors and to dispatch instructions, notably to the actuators 19 and 20.

More precisely, the control unit 11 comprises an input block 22 receiving the signals originating from the sensors 12 to 14, and notably the speed of the vehicle V, the yaw rate $\dot{\psi}$ and the angle of front wheels $\alpha_1$. The speed of the vehicle can be obtained by taking the mean of the speed of the front wheels or rear wheels such as measured by the sensors of a wheel antilock system. In this case, one sensor 13 is provided per wheel, the wheel antilock system comprising an output connected to an input of the control unit 11 for providing the vehicle speed information. Alternatively, each sensor 13 is connected to an input of the control unit 11, the control unit 11 then computing the mean of the speed of the wheels.

The control unit 11 also comprises a state observer 23, making it possible to estimate the information which is not measured and which is necessary for control, inter alia the disturbances which act on the vehicle. The state observer 23 can for example be constructed on the basis of a vehicle model with two steered wheels with no slack by making the assumption that a disturbance d of step change type can act directly on the yaw rate of the vehicle over a finite time interval. Dynamics which models the behavior of the actuator can be added. The state equation associated with the model extended by the disturbance, is the following:

$$\begin{bmatrix} \ddot{\psi} \\ \dot{\beta} \\ \dot{\alpha}_{f2} \\ \dot{d} \end{bmatrix} = \begin{pmatrix} -\frac{D_1 L_1^2 - D_2 L_2^2}{V I_z} & \frac{D_2 L_2 - D_1 L_1}{I_z} & -\frac{D_2 L_2}{I_z} & 0 \\ -1 + \frac{D_2 L_2 - D_1 L_1}{M V^2} & -\frac{D_1 + D_2}{M V} & \frac{D_2}{M V} & 0 \\ 0 & 0 & 0 & -\frac{1}{\tau} \\ 0 & 0 & 0 & 0 \end{pmatrix} \begin{bmatrix} \dot{\psi} \\ \beta \\ \alpha_{f2} \\ d \end{bmatrix} + \begin{pmatrix} 0 \\ 0 \\ \frac{1}{\tau} \\ 0 \end{pmatrix} \alpha_2 + \begin{pmatrix} \frac{D_1 L_1}{I_z} \\ \frac{D_1}{M V} \\ 0 \\ 0 \end{pmatrix} \alpha_1$$

$$y = \begin{pmatrix} 1 & 0 & 0 & 1 \end{pmatrix} \begin{bmatrix} \dot{\psi} \\ \beta \\ \alpha_{f2} \\ d \end{bmatrix}$$

in which y denotes the output considered, M the total mass of the vehicle, Iz the inertia of the vehicle about a vertical axis passing through its center of gravity, L1 the distance from the center of gravity to the front axle, L2 the distance from the center of gravity to the rear axle, L the wheelbase of the vehicle equal to L1+L2, D1 the front drift rigidity, D2 the rear drift rigidity, $\alpha 1$ the angle of the front wheels with the longitudinal axis of the vehicle, $\alpha 2$ the setpoint angle of the rear wheels, $\alpha f2$ the real deflection angle of the rear wheels, V the speed of the vehicle, $\dot{\psi}$ the yaw rate, $\beta$ the angle of drift, that is to say the angle that the velocity vector of the vehicle makes with the longitudinal axis of said vehicle, and $\tau$ the response time of the actuator.

The classical theory of linear observers is developed on the basis of this model. The state observer 23 makes it possible to estimate the states of the vehicle and all the disturbances which act on the vehicle. The state observer can therefore use the following equation:

$$\begin{bmatrix} \hat{\ddot{\psi}} \\ \hat{\dot{\beta}} \\ \hat{\dot{\alpha}}_{f2} \\ \hat{\dot{d}} \end{bmatrix} = \begin{pmatrix} -\frac{D_1 L_1^2 - D_2 L_2^2}{V I_z} & \frac{D_2 L_2 - D_1 L_1}{I_z} & -\frac{D_2 L_2}{I_z} & 0 \\ -1 + \frac{D_2 L_2 - D_2 L_1}{M V^2} & -\frac{D_1 + D_2}{M V} & \frac{D_2}{M V} & 0 \\ 0 & 0 & 0 & -\frac{1}{\tau} \\ 0 & 0 & 0 & 0 \end{pmatrix} \begin{bmatrix} \hat{\dot{\psi}} \\ \hat{\beta} \\ \hat{\alpha}_{f2} \\ \hat{d} \end{bmatrix} + \begin{pmatrix} 0 \\ 0 \\ \frac{1}{\tau} \\ 0 \end{pmatrix} \alpha_2 + \begin{pmatrix} \frac{D_1 L_1}{I_z} \\ \frac{D_1}{M V} \\ 0 \\ 0 \end{pmatrix} \alpha_1 + Ko(V)(\dot{\psi} - \hat{y})$$

$$\hat{y} = \begin{pmatrix} 1 & 0 & 0 & 1 \end{pmatrix} \begin{bmatrix} \hat{\psi} \\ \hat{\beta} \\ \hat{\alpha}_{f2} \\ \hat{d} \end{bmatrix}$$

with ^ which signifies that the values are estimated, d the disturbance undergone by the vehicle, and Ko(V) the adjustment parameter for the state observer which evolves as a function of the speed of the vehicle. The four estimated values $\hat{\psi}$, $\hat{\beta}$, $\hat{\alpha}_{f2}$ and $\hat{d}$ provide an estimate of the state of the vehicle which could be used by other elements of the control unit 11.

The control unit 11 furthermore comprises a block 24 for calculating the transients. The block 24 calculates the control value of the angle of deflection of the rear wheels 5 and 6, denoted $\alpha_{2\text{-}transient}$, which makes it possible to act on the dynamics of the transient response. The calculation can be performed by a pole placement technique. Reference may be made in this regard to the document Kautsky, J. and N. K. Nichols, "Robust Pole Assignment in Linear State Feedback", Int. J. Control, 41 (1985), pages 1129-1155. If we denote by [a1(V)+b1(V)i (a2(V)+b2(V)i (a3(V)+b3(V)i]. The three poles of the system described above without the disturbance, a(V) and b(V) corresponding respectively to the real and imaginary parts of each of the poles at the speed V, we seek the corrector K=[K1(V) K2(V) K3(V)] which will place the poles of the fed-back system at

[Tdyn11(V)·a1(V)+Tdyn12(V)·b1(V)·i
Tdyn21(V)·a2(V)+Tdyn22(V)·b2(V)·i
Tdyn31(V)·a3(V)+Tdyn32(V)·b3(V)·i]

Tdyn11, Tdyn12, Tdyn21, Tdyn22, Tdyn31, Tdyn32 being the adjustment parameters (variable as a function of the speed of the vehicle V of the transient response of the vehicle).

The corrector K(Vo) can be calculated, for each chosen speed Vo, by the pole placement procedure described in the aforesaid document. The corrector K(V) is thereafter interpolated as a function of the speed. The control variable is obtained thus:

$$\alpha_{2\text{-}Transient} = K_1(V) \cdot \hat{\psi} + K_2(V) \hat{\beta} + K_3(V) \hat{\alpha}_{f2}$$

It will be noted that if the adjustment parameters are equal to 1, the dynamic response of the vehicle is not modified, that a parameter greater than 1 results in an increase in the liveliness of the response of the vehicle and that a parameter less than 1 results in a decrease in the liveliness of the response of the vehicle. Provision may be made as follows, by way of exemplary adjustment:

Tdyn11=0.8
Tdyn12=0
Tdyn21=0.8
Tdyn22=0
Tdyn31=0.8
Tdyn32=0

Such an adjustment makes it possible to slow the dynamic response of the vehicle and to remove the oscillations in yaw rate and drift of the vehicle. At high speed, 90 km/h for example, this adjustment makes it possible to optimize the execution of a double lane-change.

The control unit 11 furthermore comprises a block 25 for calculating the static control denoted $\alpha_{2\text{-}static}$ receiving as input the angle of deflection α1 of front wheels such as measured by the sensor 12, the coefficients K1, K2 and K3 calculated the block 24 and the speed V of the vehicle measured by the sensor 13. The control $\alpha_{2\text{-}static}$ makes it possible to act on the static response of the vehicle and to modify the stabilized value of the yaw rate obtained following a steering wheel nudge of given amplitude. The result can be expressed by comparison with the static gain that would by obtained on the vehicle whose rear wheels are nonsteerable.

$$\left[ \frac{\dot{\psi}_{STABILIZED}}{\alpha_1} \right]_{4SW} = Tgs \cdot \left[ \frac{\dot{\psi}_{STABILIZED}}{\alpha_1} \right]_{2SW}$$

where Tgs is the adjustment parameter which can vary, if necessary, as a function of the speed V.

In order to render the transient and stabilized parts independent, the following correction is carried out on $\alpha_{2transient}$ $$\alpha_2 = \alpha_{2transient} - FF \cdot \alpha_1$$ where the gain "FF" is defined by the formula below:

$$(1 - (Tgs(V)) \cdot (1 + K3(V)) + Tgs(V) \cdot \left( \frac{K1(V) \cdot G\dot{\psi} + }{K2(V) \cdot G\beta 2} \right) + K2(V)$$

with:

$$G\dot{\psi} = \frac{V}{L + \frac{M \cdot (L_2 D_2 - L_1 D_1)}{LD_1 D_2}}$$

$$G_{\beta_2} = G\dot{\psi} \cdot \left( \frac{L_1}{V} + \frac{L_2 MV}{LD_1} \right)$$

This makes it possible to guarantee that $\alpha_{2stabilized} = (1 - Tgs) \cdot \alpha_1$ If Tgs is equal to 1, the static response of the vehicle is not modified and therefore identical to that of a vehicle with nonsteered rear wheels. A value of the coefficient Tgs greater than 1 results in an increase in the static response of the vehicle, while a value less than 1 results in a decrease in the static response of the vehicle. It is possible to provide that Tgs=1.2 for a speed of 90 km/h, thereby making it possible to render the response of the vehicle more direct and therefore to optimize the execution of a double lane-change.

The control unit 11 is completed with a subtracter 26, an output 27 and a unitary delay 28. The subtracter 26 receives on its positive input the control output $\alpha_{2\text{-}transient}$ of the block 24 and on its negative input the control output $\alpha_{2\text{-}static}$ of the block 25. The output of the subtracter 26 is connected, on the one hand, to the general output 27 of the control unit 11, and, on the other hand, to the unitary delay 28, whose output is connected to an input of the state observer 23 so as to provide it with the angle of deflection of the rear wheels at a previous instant.

The rear wheel deflection control system exhibits a closed-loop structure by means of a controller making it possible to modify the dynamics of the system and a gain allowing the adjustment of the static gain, the whole variable as a function of speed.

The control strategy makes it possible to adjust the transient part of the lateral response of the vehicle to a steering wheel nudge. In particular, it is possible to adjust the speed of the response as well as its damping. The final adjustment, dependent on the speed of the vehicle, makes it possible to optimize the effectiveness and the ease of execution of a double lane-change or else low-speed maneuver.

The control strategy makes it possible to adjust the static part of the lateral response of the vehicle to a steering wheel nudge. The final adjustment, dependent on the speed of the vehicle, makes it possible for example to optimize the effectiveness and the ease of execution of a double lane-change and/or low-speed maneuver.

The static and dynamic parts of the response of the vehicle can form the subject of an independent adjustment. The closed-loop structure ensures excellent precision and high robustness. As a variant, an open-loop structure can be envisaged. Furthermore, it is possible to take account of the dynamics of the actuator 9 of the front wheels 3 and 4 and of the actuators 19 and 20 of the rear wheels 5 and 6. The adjustment of the parameters is fast and intuitive, since said parameters are linked with the minimum performance of the vehicle, that is to say to the performance of a vehicle with nonsteered rear wheels. Specifically, adjustment parameters equal to 1 do not modify the behavior of the vehicle, whereas adjustment parameters greater than 1 render the behavior more lively and more direct and vice-versa.

The control unit 11 comprises a system 29 for monitoring the static part $\alpha_{2\text{-static}}$ of the setpoint. A system for monitoring the dynamic part $\alpha_{2\text{-dynamic}}$ of the setpoint can also be implemented. The monitoring system 29 can take the form of a software part stored in a remanent memory of the control unit 11 and executed by the microprocessor of the control unit 11 or else of a dedicated microcircuit associated with the microprocessor. The monitoring system 29 determines whether the static part $\alpha_{2\text{-static}}$ complies with a template and emits an alarm in the event that the template is overstepped. The alarm is transmitted to an external device (not represented). Alternatively, the alarm causes a modification of the static part $\alpha_{2\text{-static}}$ by substituting it with the limit imposed by the template.

Figure 3:
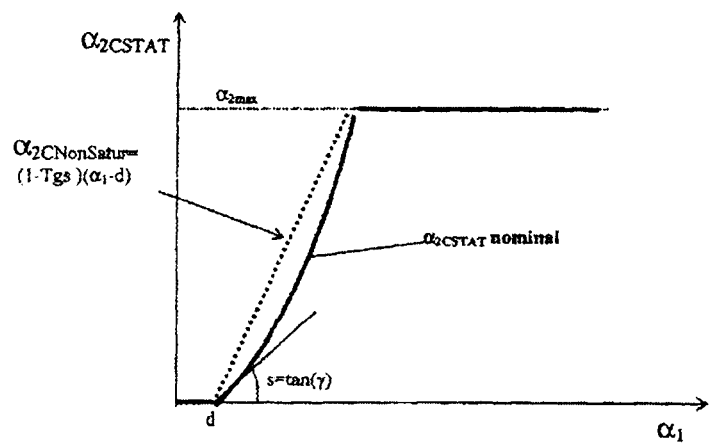
FIG. 3 is a curve showing the calculation of a static part of a deflection setpoint.

For each speed, the nominal deflection setpoint $\alpha_{2\text{-static}}$ is calculated as follows:

$$\alpha_{2-STATIC}\text{nominal} = \begin{cases} a_{2max} & \text{if } |\alpha_{2NonSatur}| > |\alpha_{2max}| \\ a_{2NonSatur} & \text{if } |\alpha_1| \geq d \text{ and } |\alpha_{2NonSatur}| \leq |\alpha_{2max}| \\ 0 & \text{if } |\alpha_1| < d \end{cases}$$

with $\alpha_{2NonSatur}=K(1-Tgs)(\alpha_1-d)$, see FIG. 3, where K is a shape factor which satisfies $0 \leq K \leq 1$, which is calculated by imposing a slope s at the point $\alpha_1=d$, and d is a dead area for which the rear deflection is zero. $\alpha_{2max}$ is a ceiling value of the static part of the setpoint.

The parameter Tgs is always positive and depends solely on the speed. If Tgs=1, then the static setpoint $\alpha_{2\text{-static}}=0$, which is equivalent in the steady state, once the yaw rate has been stabilized, to a 2-steered-wheel vehicle.

In checking the static deflection setpoint, the monitoring system 29 separately verifies the sign and the absolute value of the latter.

According to a first embodiment, the sign is determined:

$$\text{sign}(\alpha_{2\text{-static}})=\text{sign}(\alpha_1) \text{ if } 0<Tgs<1 \quad (1)$$

$$\text{sign}(\alpha_{2\text{-static}})=-\text{sign}(\alpha_1) \text{ if } Tgs>1 \quad (2)$$

$$\alpha_{2\text{-static}}\approx 0 \text{ if } Tgs=1 \quad (3)$$

An error will therefore be signaled if one of these three relations is not satisfied.

In order to monitor the absolute value of the static deflection setpoint, the monitoring system 29 establishes the straight lines which describe an upper bound and a lower bound of said value.

$$\text{Upper bound: } |\alpha_{2upper\ bound}|=|(1-Tgs)\alpha_1|+b1 \quad (4)$$

$$\text{Lower bound: } |\alpha_{2lower\ bound}|=|(1-Tgs)\alpha_1|+b2 \quad (5)$$

Figure 4:
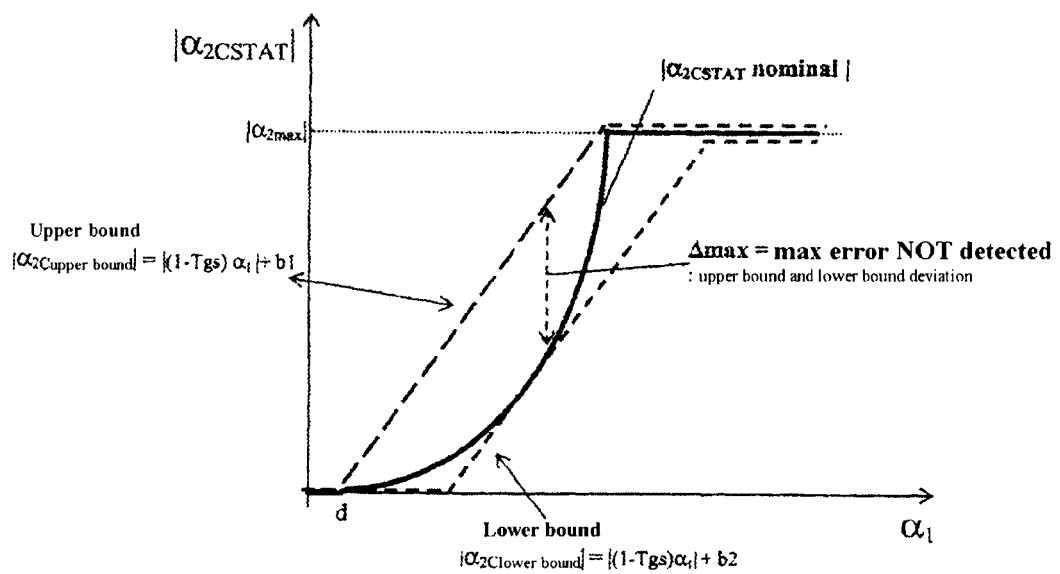
FIGS. 4 and 5 are curves showing examples of templates.

With $b1=-(1-Tgs)*d$ and b2 calculated so that the lower bound is parallel to the upper bound and tangential to the curve bounded below $|\alpha_{2\text{-static}}$ nominal$|$, see FIG. 4.

Thus, for all $Tgs \neq 1$, the monitoring system 29 verifies that $$|(1-Tgs)\alpha_1|+b2 \leq |\alpha_{2\text{-static}}| \leq |(1-Tgs)\alpha_1|+b1 \quad (6)$$

and if $Tgs \approx 1$, the monitoring system 29 verifies that the setpoint is small:

$$|\alpha_{2\text{-static}}| \approx 0 \quad (7)$$

The monitoring system 29 signals an error when a predetermined deviation Δ with respect to the nominal value implies that the calculated setpoint is outside the template defined by the upper bound and the lower bound.

By way of indication, this strategy operates well in about 95% of real driving situations, if the deviations that have to be detected are those greater than 0.3°. Additionally, the remaining situations occur for speeds of less than 55 km/h, and are therefore not dangerous.

In order to implement this strategy for safety purposes, it is necessary for reliable information regarding the angles of deflection of the front wheels, the vehicle speed, and the safe value Tgs=f(V) to be available in real time.

A second embodiment aims to dispense with the information Tgs=f(V), and this may be useful in cases where this information, which must be available in real time, is not safe.

In its place, the maximum and minimum values of Tgs are used, as well as the speed for which Tgs changes sign.

Figure 5:
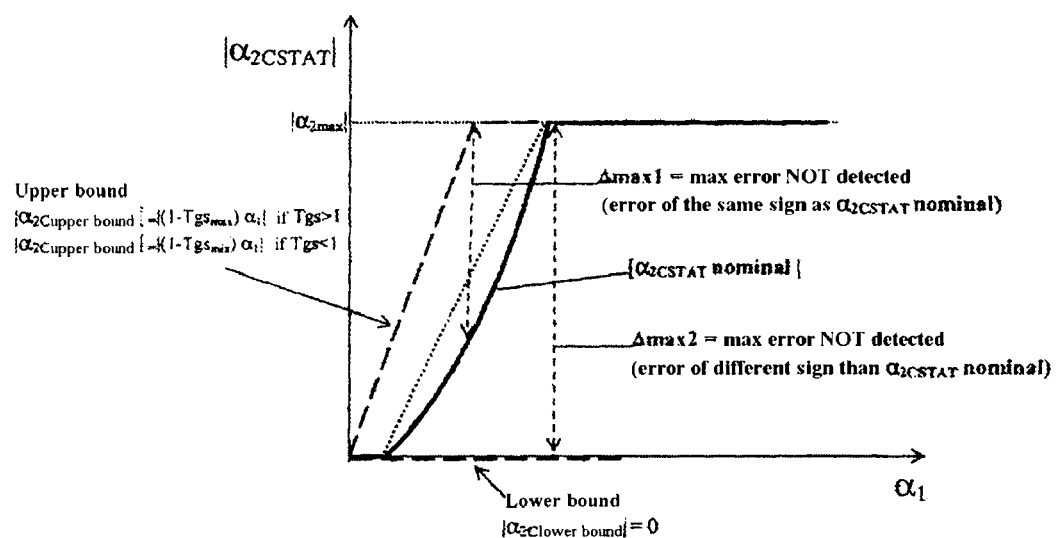

For each speed, the monitoring system 29 establishes the template of FIG. 5.

Thus, if Tgs>1, the monitoring system 29 verifies that $$0 \leq |\alpha_{2\text{-static}}| \leq |(1-TgS_{max})\alpha_1| \quad (8)$$

If 0<Tgs<1, the monitoring system 29 verifies that $$0 \leq |\alpha_{2\text{-static}}| \leq |(1-Tgs_{min})\alpha_1| \quad (9)$$

If $Tgs \approx 1$, the monitoring system 29 verifies that the setpoint is small:

$$|\alpha_{2\text{-static}}| \approx 0 \quad (10)$$

It is considered that $\alpha_1$ and V are safe information at input, but there is no longer any need for the parameter Tgs=f(V) in real time and made safe in order to implement this control strategy, since only the values $TgS_{max}$ and $Tgs_{min}$ and the speed for which Tgs changes sign are used for the calculation of the templates.

In this embodiment, the sign of $\alpha_2$ is checked as described previously for the first mode.

This embodiment is therefore cruder and more robust.

The invention offers increased safety of the setpoint for deflecting the rear wheels with economical means.

The invention claimed is:

1. A method for monitoring control of steered rear wheel deflection for a vehicle with at least three steered wheels, comprising:

comparing a steered rear wheel deflection setpoint with a template, the comparing being performed by a computer generating the setpoint, and the template being a function of an angle of deflection of front wheels or of an angle of a steering wheel.

2. The method as claimed in claim 1, in which a static steered rear wheel deflection setpoint is compared with a template.

3. The method as claimed in claim 1, in which the template comprises a lower bound and an upper bound.

4. The method as claimed in claim 3, in which the upper bound has a zero value up to a first threshold, is linearly increasing between the first threshold and a second threshold, and has a constant value beyond the second threshold.

5. The method as claimed in claim 4, in which the first threshold has a zero value.

6. The method as claimed in claim 4, in which the first threshold has a value greater than zero.

7. The method as claimed in claim 3, in which the lower bound has a zero value.

8. The method as claimed in claim 3, in which the lower bound has a zero value up to a third threshold, is linearly increasing between the third threshold and a fourth threshold, and has a constant value beyond the fourth threshold.

9. The method as claimed in claim 3, further comprising: signaling an error when the steered wheel deflection setpoint is determined to be outside the template defined by the upper and lower bound.

10. The method as claimed in claim 1, further comprising: estimating the states of the vehicle and disturbances which act on the vehicle.

11. A system for monitoring control of a steered rear wheel deflection for a vehicle with at least three steered wheels, comprising:
a comparison unit configured to compare a steered rear wheel deflection setpoint with a template, the comparison being performed by a computer generating the setpoint, and the template being a function of an angle of deflection of front wheels or of an angle of a steering wheel.

12. The system as claimed in claim 11, in which the template is stored in a nonvolatile memory.

13. The system as claimed in claim 11, in which a state observation unit is configured to estimate the states of the vehicle and disturbances which act on the vehicle.

* * * * *